No. 765,905. PATENTED JULY 26, 1904.
M. ROSE.
LEGGING.
APPLICATION FILED JAN. 21, 1903.
NO MODEL.
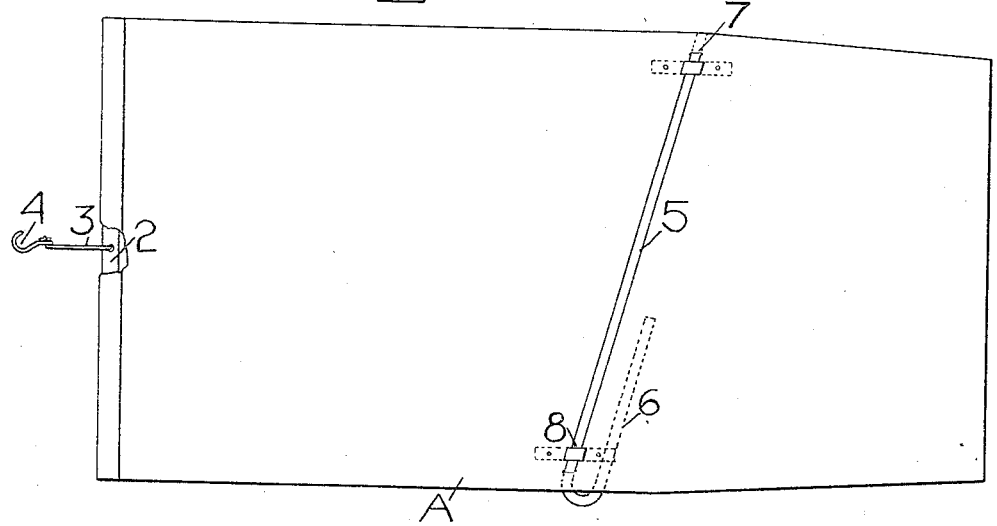
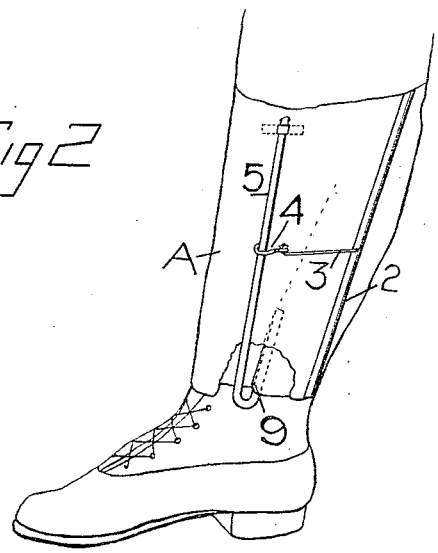
Witnesses
Inventor
Maxim Rose
By Geo H Strong
Attorney No. 765,905. Patented July 26, 1904.

UNITED STATES PATENT OFFICE.

MAXIM ROSE, OF SAN FRANCISCO, CALIFORNIA.

LEGGING.

SPECIFICATION forming part of Letters Patent No. 765,905, dated July 26, 1904.

Application filed January 21, 1903. Serial No. 140,056. (No model.)

*To all whom it may concern:*

Be it known that I, MAXIM ROSE, a citizen of the United States, and a resident of the city and county of San Francisco, State of California, have invented certain new and useful Improvements in Leggings, of which the following is a full, clear, and exact description, reference being had to the accompanying drawings, forming a part hereof.

My invention relates to improvements in leggings for the protection of the lower part of the legs and trousers; and it consists of a flexible wholly or partially waterproof material adapted to wrap around the leg and having a stiffener at one edge and a bar near the other edge, with an upturned hook at the lower end of said bar adapted to engage the lower edge of the fold of the trousers. A hook and elastic cord connect the edge of the leggings with the bar to hold the leggings in place.

It also comprises details of construction, which will be more fully explained by reference to the accompanying drawings, in which—

Figure 1 is a view of the legging extended and showing its appurtenances. Fig. 2 is a view showing the application of the legging.

A represents the legging, which is of suitable flexible material for the purpose, preferably waterproof, and which has sufficient length to wrap around the lower part of the leg with some overlap.

At one edge is fixed or inserted a stiffening-strip, as at 2, and central of this edge is secured an elastic cord, as at 3, having a hook 4 attached to it for the purpose to be hereinafter described.

At a point intermediate between this edge and the opposite edge of the legging is attached a rod or bar 5, having a hook-shaped upturned portion, as at 6, of less length than the length of the rod. The rod may be attached in any suitable manner. In the present case I have shown it conveniently secured by inserting it through holes, as at 7, made near the top and bottom of the legging, and it may be fixed to the legging either by stitching thread around it or by a clamp of any suitable description, as at 8.

As here shown, the greater portion of the long arm of the rod is exterior to the legging, and the upturned portion 6 extends up on the inside.

In order to attach the device, the lower edge of the trousers is first folded around the leg, so as to make them comparatively tight at the bottom, and in this folding an overlap is formed, as at 9. The portion 6 of the hook, which extends up interior to the legging, is then inserted into the overlap or fold at 9, and the shorter end of the material A being laid upon the fold the remaining portion of the legging is carried around the bottom of the leg, the hook entering the fold serving to retain that portion of the legging, while the longer portion is drawn around until the stiffened edge, as at 2, is approximately near to the rod 5. By drawing upon the hook 4 the elasticity of the connection 3 will be sufficient to allow the hook to be engaged with the rod 5, and the device is thus firmly fixed in place and forms a secure protection for the bottom of the trousers.

To disengage, it is only necessary to release the hook 4 and unroll the legging, slipping the hook out of the fold in the trousers, which will be allowed to assume their normal position, and the leggings can be rolled up into very small compass and placed in the pocket or otherwise disposed of.

Having thus described my invention, what I claim, and desire to secure by Letters Patent, is—

1. The combination in a legging of a sheet of flexible fabric having a stiffening-bar at one edge, a hook-shaped rod extending from top to bottom of the sheet intermediate of its ends, with a hook upon the inside and bottom to engage a fold in the trousers, and means connecting with the stiffened edge of the fabric whereby said edge may be connected with the hook-rod.

2. A legging for the protection of trousers consisting of a sheet of fabric of greater length than the distance around the leg, said fabric having a stiffening-strip in one edge, a rod secured to the fabric intermediate of its ends and at an angle with the stiffened edge, said rod having an inturned upwardly-extending hook at the bottom adapted to engage with the fold of the trousers, an elastic cord and hook connecting with the stiffened edge adapted to be engaged with the rod when the legging has been wound around the leg.

In testimony whereof I affix my signature in presence of two witnesses.

MAXIM ROSE.

Witnesses:
 FRED EMONDS,
 ROBERT STONE.